United States Patent [19]

Murphy et al.

[11] 4,212,372
[45] Jul. 15, 1980

[54] LUBRICATION PROCESS AND APPARATUS

[75] Inventors: William C. Murphy; Lyle G. Myers, both of Fremont, Mich.

[73] Assignee: Molychem, Inc., Bailey, Mich.

[21] Appl. No.: 917,790

[22] Filed: Jun. 22, 1978

[51] Int. Cl.² ............................................. F16N 7/00
[52] U.S. Cl. .................................... 184/15 B; 184/6; 198/500
[58] Field of Search ................. 184/15 B, 15 A, 15 R, 184/6 R, 7 R; 198/500

[56] References Cited

U.S. PATENT DOCUMENTS

| | | | |
|---|---|---|---|
| 1,919,451 | 7/1933 | Schaefer | 184/15 B UX |
| 2,664,969 | 1/1954 | Bjerre | 184/15 B |
| 3,017,955 | 1/1962 | Tassile | 184/15 A |
| 3,067,837 | 12/1962 | Burrows | 184/15 B |
| 3,116,810 | 1/1964 | Olson | 184/15 B |
| 3,785,456 | 1/1974 | McIntire et al. | 184/15 R X |
| 4,064,970 | 12/1977 | Reeves | 184/15 B |

*Primary Examiner*—David H. Brown
*Attorney, Agent, or Firm*—Miller, Morriss and Pappas

[57] ABSTRACT

An apparatus and system or process for lubrication of conveyor trolleys and similar moving bearing points as found in conveyor chain and associated conveyor equipment. The apparatus includes a wheel positioning locator in the form of a trolley track section having openings through the web and movement controlling cam blocks which engage and orient trolley wheels and chain assuring proper positional location of the bearings adjacent the emission point of lubricant capillaries and in avoidance of damaging contact between capillaries and moving trolleys or chain equipment. One track flange provides support for electrical equipment and limit switches. The other track flange supports the trolley wheels. The lubricating circuit is a constant pressure circulating system from a central storage tank and running to valves, and the valves located at the capillary tubes. The valves are solenoid operated and the solenoids are fired by capacitor discharge, the interval of solenoid performance being adjustable electrically to vary the quantum of delivered lubricant. The process includes the adjustment of lubricating interval on the delivery of a metered amount of liquid lubricant through the capillaries and to the lubrication situs with zero or minimal drip. Plural lubricator stations or lubrication heads are served from a common or central lubrication source remote from the situs of lubrication application.

6 Claims, 5 Drawing Figures

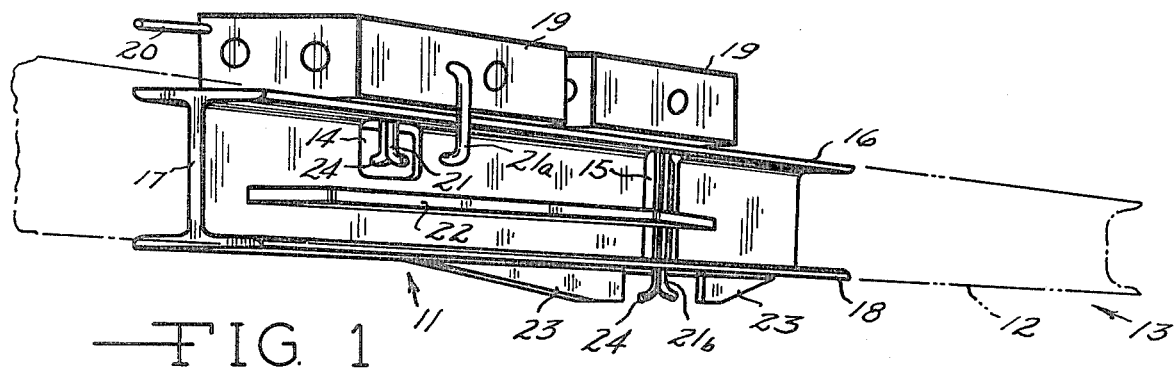
FIG. 1
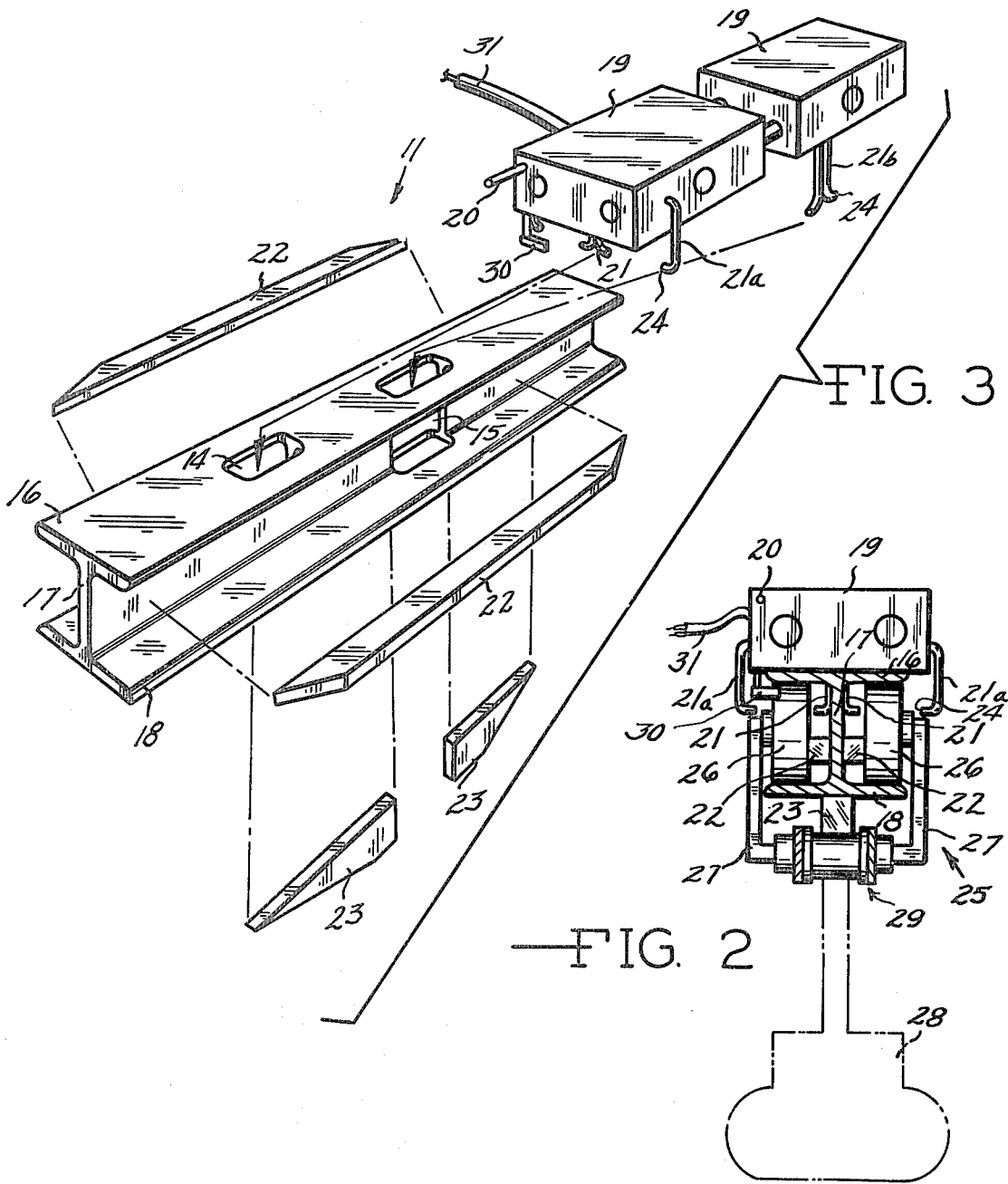
FIG. 3
FIG. 2

LUBRICATION PROCESS AND APPARATUS

The present invention is a lubrication system and apparatus therefor which is especially useful in connection with the lubrication of trolley and chain conveyor devices as found, for example, in automobile and assembly plants in which the conveyors handle large and heavy pieces transporting them to various rates of speed and along various routings for timed convergence of parts at stations for release or work or even dwell. The driving means in such equipment is usually via a chain in which the links include journals and the journals require regular lubrication and inspection at intervals in order to assure minimum shutdown for repair and maintenance. The chains are the drivers and carry depending elements or parts and frequently overhead trolleys that ride on track. The track is usually in the form of an I or H structural beam. The lowermost flange of the track supports pairs of trolley wheels, the web portion of the track runs between the wheels in vertical orientation and the upper flange provides a track securing means for attachment to conveyor structural support. This general arrangement makes it difficult for the moving parts (chain and trolleys) to be effectively lubricated. If improperly lubricated wear develops and the parts wear out. If over lubricated the lubricant drips or is displaced from the moving parts and frequently contaminates the parts being transported by the conveyor. This also occurs if the lubrication is not precision delivered to the precise point of use. The lubricating housekeeping problem within large factories using conveyors is difficult and expensive and not unusually requires constant service to and from the tank to lubricators at diverse points in the plant.

BACKGROUND OF THE ART

The earliest lubrication systems for conveyors were oilers manually serving wear points in conveyor machinery. As labor expense increased along with trolley complexity, there was an interest in providing lubrication stations, each carrying its own separate lubrication reservoir as seen, for example, in U.S. Pat. No. 3,903,994 to Henry F. Hafner and in U.S. Pat. No. 3,017,955 to Celso Tassile. Service of lubricant from a central reservoir remote from the point of use is exemplified in the prior art by the U.S. Pat. No. 3,785,456 to Nathan M. McIntire and Zelma M. Porter and in the U.S. Pat. No. 3,934,600 of William C. Murphy with recirculation at the lubricating valves.

The present invention goes beyond the prior art in providing more accurate chain and trolley lubrication, by providing capillary lubricant distribution under rigid quantum control and in the combination of a section of track, the track providing locating means and mounting means and lubricant heads including solenoids, valves and controls and capillaries served from a remote source of lubricant piped to the lubricating head.

The present invention provides a central lubrication supply maintained and serving all lubrication points at a fixed or constant pressure. The lubrication points are each serviced by capillary tubes with discharge ends adjusted to precision delivery to bearing or journal surfaces.

The present invention locates a solenoid operated valve in the line at the capillaries and the solenoids are fired by capacitor discharge and the interval of delivery may thus be adjusted. This type of firing of the solenoids results in accurate metering and in consequent avoidance of excess application of lubricant.

The electrical signal for discharge is via limit switches located to precision trip the capacitor discharge to the solenoid valve to cause lubricant flow in accord with track or trolley movement and position.

The position of the moving chain and trolley is made to be precise by a track section serving as the lubrication station and which is ramped to assure horizontal and vertical adjustment or alignment through the station. The track section provides a mounting base for electrical controls, limit switches, valves and capillaries and including web protected capillary access between pairs of trolley wheels, for example. This allows hitherto inaccessible points to be reached by the capillary tubes.

The electrical circuit is simple and adjustable by insertion of resistance to achieve a selected timed interval for lubricant delivery by attenuation of the capacitor discharge which fires the solenoids serving the valves. This selected delivery permeates the following objects.

Accordingly, the principal object is a new and improved lubrication system having a central lubricant supply line serving a plurality of lubrication stations. Another object of the present invention is to provide a structure or lubricating head at each lubrication station to precision locate the moving points requiring lubrication.

Another object is to synchronize the location of moving elements in proximity to capillary inboard service between trolley wheels and to outboard service of trolley wheels, for example, and to provide structural support for controls accommodating the existing conveyor or track and hence non-disruptive in installation of conveyor or apparatus.

Other objects including simplicity and ease of service and avoidance of splash and drip of lubricants will be better appreciated as the description proceeds.

GENERAL DESCRIPTION

In general, the present invention comprises a constantly running central lubricant supply source providing lubricant under a relatively constant line pressure to a plurality of lubrication delivery stations remote from the source of central supply. The supply of lubricant is connected to the delivery points or supply heads by capillary tubes and between each capillary tube or tubes and the lubricant supply line is a valve. The valves are solenoid operated. The solenoids are fired to open the valves by the discharge of a capacitance and a limit switch, adjusted to engage structures moving on the track, signals the discharge. The interval of the solenoid opening is variable by insertion of a specific attenuation in the control circuit as by adjustment of resistance. The lubrication stations include a short section of modified track which may be existing track or a section which is aligned and inserted in the regular track serving conveyor equipment as, for example, an H or I cross section form. Trolley wheels travel on the lower flanges of the track and separated by the vertical web portion. The uppermost track flanges provide a mounting means for the control elements, valves and lubrication lines, the capillaries reacting through the upper flange and through cut-out access openings through the web intermediate the flanges. The upper flanges also provide structural attachment means anchoring the track in position. The web portion of the track is provided with cams against which the trolley wheels and chains are guidably moved so that the bearings of the trolley and chain are precision located adjacent the emission openings in the capillary tubes.

Where capillary tubes serve drive chain beneath the lower flange surface, the capillaries pass through an opening in the web and also through the lower flanges and are protected by the vertical edges of plates forming a ramp or fin piece so that the capillaries are proximate to the precise point of chain lubrication, for example. The cams and ramp assure that neither trolley nor chain, nor parts carried, can engage or damage the capillaries and the capillaries are thus locatable horizontally and vertically to achieve precision application of lubricant. Final adjustment of the capillary tube tips is easily and manually achieved as by slight bending of the tubes to direct them as required.

A central reservoir or tank is conveniently located and a pump with a relief valve in the delivery line assures constant pressure in the lubricant supply lines. Depending on the number of lubricating heads served, the mains from the pump may supply lubricant through the entire plant and branch supply lines all lead from the mains to the lubricating heads or control boxes.

The electrical control circuit, along with the control valves, is located in the control boxes or lubricating heads and fed by appropriate line current and lubricant piping to the valves. Limit switches are secured to depend into selected contact with wheels, chain, or parts moving by the stations. The limit switches control the firing of a solenoid in each valve. The solenoid opens the valve on signal from the limit switch and when the solenoid circuit is broken the valve closes. The limit switch, on tripping, acts to discharge a capacitor which pops the solenoid on the valve and opens the valve. The capacitor discharge structure is potted in the base portion of the terminal block in avoidance of tampering.

By varying the resistance in the capacitor discharge line, the lubrication interval is adjusted or selected by the attenuation of the discharge signal. The solenoid remains open for a duration timed by a resistance selectively inserted in the circuit so that the lubricant emitted from each capillary tube is in the precise amount required. Line current is transformed and rectified to selected DC voltage which operates the valves and controls.

IN THE DRAWINGS

FIG. 1 is a perspective view of a lubricator track section in accord with the present invention inserted on a conveyor track and showing the control boxes and capillary tubes with locating and protecting cams.

FIG. 2 is an end elevation full section view of the track section seen in FIG. 1 and showing a trolley and chain carriage with wheels engaging the lowermost flange and the trolley and chain moving into the lubricating station. The trolley is shown carrying a work piece such as a motor block in phantom line.

FIG. 3 is an exploded perspective view of the track section and control boxes seen in FIG. 1 and showing the locating and protecting cams in better relation and revealing the openings through the track web and flanges for capillary tube positioning.

SPECIFIC DESCRIPTION

Figure 4:
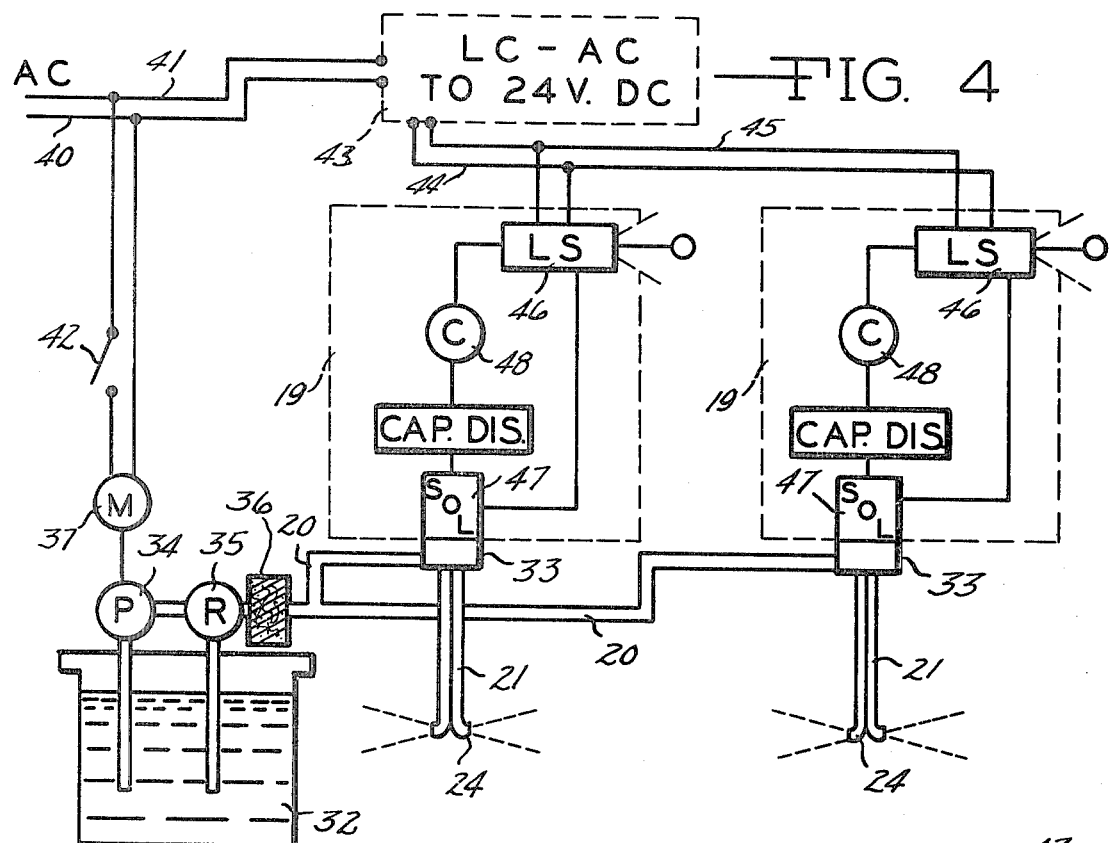
FIG. 4 is a somewhat schematic flow diagram with electrical control overlays showing the system of the present invention.

Referring to the drawings and with first particularity to the FIG. 1 thereof, the conveyor track section 11 is inserted as by welding, brazing or modification of existing track 12 so as to provide a lubrication station at any selected point in a conveyor line 13. In general, the track section 11 has a cross section substantially identical with the track 13 and may be viewed as a continuation of the conveyor line 13. Openings 14 and 15 are selectively extended through the upper flange 16 and either partially or wholly through the web 17 intermediate the upper flanges 16 and the lower track flanges 18 in accord with where the lubricant is to be applied. In general, the cross section configuration of the track section 11 is that of an I or H structural member. On the upper flange 16 control boxes 19 are provided. Each control box 19 may be viewed as a lubricating head and will be seen to include a normally closed solenoid valve, a lubricant supply line to the valve, and capillary delivery tube lines from the valve. Also, the electrical elements necessary to control the valve, including limit switches and circuit, are housed in the control boxes 19. The lubricant supply line 20 is visible in the FIG. 1 feeding into the boxes 19. The inner capillary tubes 21 and outer capillary tubes 21a are shown depending from the boxes 19 to proximate delivery points, as shown. From one of the boxes 19, inner capillary tubes 21b extend below and through the lower flanges 18. These tubes 21b are somewhat longer than the tubes 21 and 21a.

Cam plates or ramp blocks 22 extend horizontally from the web 17 of the track section 11. Below the lowermost flanges 18, and substantially in the plane of the web 17, are the vertically extending cams or ramp plates 23. The cam or ramp plates 22 and 23 will be seen to perform dual functions. The cam or ramp plates 22 and 23 provide guidance means to precision locate the elements such as chain or trolleys in respect to the track 11 so as to present them in a repeat precision manner to proximate location adjacent delivery tip ends 24 of the capillary tubes 21, 21a and 21b. The cam or ramp plates 22 and 23 also protect the capillary tubes 21, 21a and 21b from interference contact with moving trolleys, wheels, chain or parts by establishing control over vertical and horizontal positioning of moving structures.

In FIG. 2 the track section 11 is shown with a trolley element 25 travelling on the track 12 at the section 11. The trolley wheels 26 ride on the flanges 18 and the trolley hangers 27 depend therefrom and support the work part 28 and are connected to and driven by the conveyor chain 29. The cam plates ramp blocks 22 adjust the positioning of the wheels 26 so that the inner capillary tubes are precisely accessible to the wheel bearings on the inner side and the outer capillary tubes 21a are proximate to the hanger bearings on the same wheels 26. A limit switch 30 is shown depending from the control box 19 to an interference position with the wheel 26 of the trolley 25. Engagement with the limit switch 30, as will be seen, fires the solenoid valve in the control box 19 and delivers a metered amount of lubricant through the capillary tubes 21 and 21a and to the bearings or the selected lubrication situs. The cam plates or ramp block 22 also assure, by careful guiding of the wheels 26 and trolley 25, that the capillaries 21 and 21a will not be struck and damaged by the passing apparatus. The cam plate or ramp block 23 provides an analogous vertical control function as it engages the chain 29 in prevention of vertical jiggling at the critical lubrication position and in prevention of damage to the tip ends 24 of the capillary tubes 21b. A separate limit switch establishes the application of lubricant emission against the chain 29 and the bearings thereof.

As will be appreciated, a plurality of capillary tubes 21 and 21a can be served by a common valve at a single control station all functioning in accord with a single limit switch position. Where a separate interval or sequencing is sought for other bearings, another station or lubricating head represented by another control box 19 can be plugged in on the lubricant supply line 20.

In FIG. 3 the construction of the track section 11 is better understood since the access openings 14 and 15 are better shown through the upper flanges 16 and the web 17 and in the instance of opening 15, through the flanges 18. The cam plates or ramp blocks 22 and 23 are shown so that the construction of the track section 11 is best understood. Without any interference with a conveyor line 13, the openings 14 and 15 may be torched out and the cam plates 22 and 23 secured in position. The cam plates or ramp blocks 22 and 23 may be secured to the web 17 and lower flanges 18 as by welding, brazing or other convenient means leaving gaps where desired in the openings 14 and 15 for the delivery positioning of the tip ends 24 of the capillary tubes 21, 21a and 21b. In most conveyor lines 13 the track 12 is bolted to plant structure through the upper flanges 16 at selected intervals and these upper flanges therefore provide an excellent mounting base for the control boxes or lubrication heads 19. Electrical lines 31 are easily run into the boxes 19, as shown, and as will be seen the operating control current is low voltage direct current.

In FIG. 4 the entire lubrication system of the present invention is brought into focus. A central supply tank 32 is provided wherever convenient in a plant and light supply lines or pipes 20 carry the lubricant under relatively constant pressure to the control boxes or stations 19. The supply lines are then connected to valves 33. The valves 33 are normally closed and, when open, they deliver lubricant under line pressure to the capillary tubes 21, as shown. There may be one or more capillary tubes connected to any single valve 33. A pump 34 is provided having its suction pick-up in the tank 32. The delivery side of the pump 34 passes the lubricant continuously to the relief valve 35 which maintains a constant line pressure (usually maintained at about 20 pounds per square inch) in the supply lines 20. A filter 36 between the relief valve 35 and line 20 avoids the entrainment of any foreign particles which might plug or impair delivery from the solenoid valves 33 and capillaries 21. The pump 34 is driven by the electric motor 37. The flow of liquid lubricant is continuous through the pump 34 and circulating in the tank 32 as the relief valve 35 returns surplus lubricant to the tank 32 while maintaining constant and continuous line pressure at the valves 33 and in the supply lines 20.

Electrical leads 40 and 41, suitably fused (not shown), are connected to the pump drive motor 37 and also to the alternating current side of a rectifier-transformer 43. A motor switch 42 is provided. The line current is reduced from, say, 120 volts alternating current to 24 volts direct current for control purposes, as will be seen. The leads 44 and 45 distribute the direct current electricity to one or more control boxes 19. A limit switch 46 (seen as limit switch 30 in FIG. 2) in each control box 19 is provided and its function is to pick off a mechanical movement as by an interference with passing apparatus (trolley, chain, or part, for example) to energize the solenoids 47 of the valves 33. This fires the solenoids by means of capacitors 48 and 48' which provides a sudden selected release of stored energy and the capacitor discharge occurs upon the selected closing of the limit switch 46. The capacitor discharge is attenuated or modified by variation in resistance so that the holding open of the solenoid valve 33 is selected to suit a particular task. When the solenoid 47 is fired, the valve 33 is opened and the lubricant under constant line pressure is urged from the capillary tubes 21 in a short dynamic burst at the selected interval. The emission from the tips 24 of the capillary tubes 21 is proximate to the point of use and hence smaller quantities of lubricant are needed at the precise point of use and contamination by dripping of the lubricant is substantially eliminated. The phantom lines at the tips 24 of the capillary tubes 21 symbolize delivery of lubricant.

Figure 5:
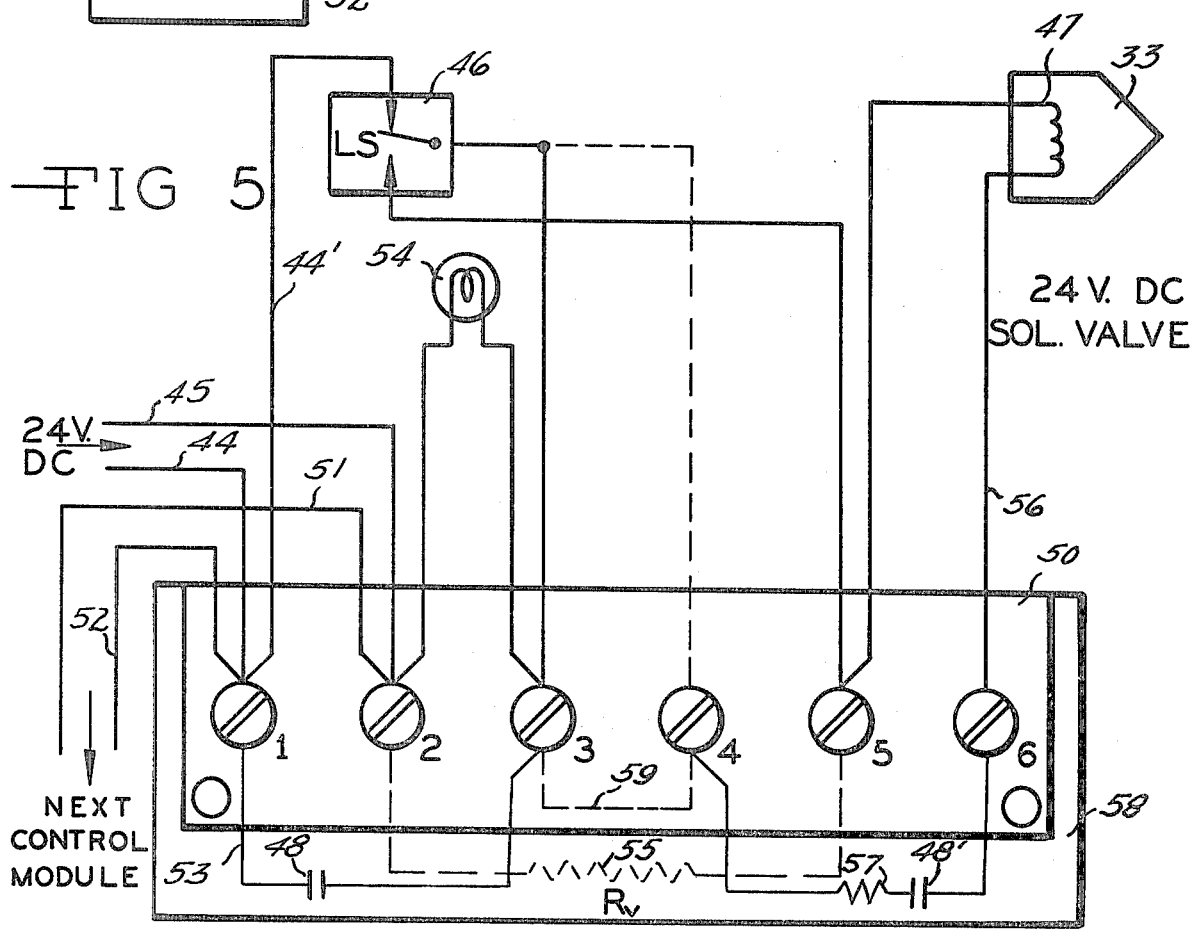
FIG. 5 is a wiring diagram of a somewhat schematic type and indicating a specific mode of wiring to control the solenoid operated valve with selected lubricating interval.

In FIG. 5 the wiring diagram expresses what occurs in control and the schematic wiring of the control box 19. The 24 volt direct current enters on lines 44 and 45 and the lines 44 and 45 are connected, respectively, to the terminals 2 and 1 of the terminal strip 50. Parallel leads 51 and 52 run out of the same terminals for energizing other control boxes 19. The lead 44' runs from the terminal 1 to one side of the limit switch 46, as shown. Also running from the terminal 1 is the lead 53 which leads to one side of the capacitor 48. The other side of the capacitor 48 is connected to the terminal 3. Terminal 3 is also connected to the oscillating bar of the limit switch 46 and to the pilot light 54, then to terminal 2 and thence to the control lead 45 and out of the box with line 52. Terminal 5 is connected to the lower side position of the limit switch 46 and also to the solenoid 47 of the valve 33. A variable resistor 55 may be connected to the terminal 2 on one side and the terminal 5 on the other side. As will be seen, this resistor 55 is a trim resistor and is inserted to attenuate or modify the interval of the solenoid. From the solenoid 47 a line 56 is connected to the terminal 6 and the terminal 6 is also connected to one side of the capacitor 48'. The other side of the capacitor 48' is connected to a fixed resistor 57 and through the resistor 57 to the terminal 4. The capacitors 48 and 48' and the resistor 57 are located in the block 58 and are potted in place. Thus, the block 58 and capacitance included therein is a capacitor discharge structure firing or energizing the solenoid 47.

The function of the capacitors 48 and 48' is to apply a capacitor discharge to the solenoid 47 to provide a most efficient and effective opening of the valve 33 and the abrupt shut-off to eliminate drip at an interval of time that is precisely repeatable. The function of the variable resistance 55 is to trim or adjust the holding or ejection intervals of the solenoid 47 by attenuation of the capacitance.

Adjustment is achieved in the following manner. For minimum lubrication ejection based on the capacitors 48 and 48' the line from the limit switch to terminal 3 is used as shown in solid line. For medium lubrication ejection the line from the limit switch to terminal 3 is relocated as indicated in the phantom line to connect at terminal 4. For maximum lubrication ejection the jumper 59 is positioned between terminals 3 and 4 with either position of the limit switch line to terminals 3 or 4. By applying a selected resistance 55 between terminals 2 and 5, a reduction in the volume of lubricant ejected is achievable at any of the minimum, medium or maximum lubrication ejection positions.

The power supply (24 volts Direct Current) and the lubricant supply (¼ inch diameter to the valve) are capable of supplying lubricant at 20 pound per square inch to many lubrication stations, each sensitive to particular local lubrication situations. The units are relatively trouble-free and the central supply source eliminates much labor expended in delivering lubricant to a plurality of tanks at all lubrication stations. The capacity of the central tank or reservoir is at the option of the user and 400 to 4000 pound installations have been made. Further, the reservoirs are locatable in non-essential areas of the plant. The lubrication heads have also been applied to drill presses and other machine tools and systems besides conveyors. Safety and housekeeping is improved and energy consumption is minimized since lubricant only flows on demand at carefully metered quantities. Further, the system involving the central supply or distribution assures flexibility of lubrication to all parts of the plant.

Having thus described an operative and best embodiment of the invention, others skilled in the art will perceive changes, improvements and modifications and such changes, improvements and modifications are intended to form a part hereof limited only by the scope of the hereinafter appended claims.

We claim:

1. In a central source lubricating system in which one or more capillary tubes are valve controlled and remote from the supply source, the construction comprising:
   a track section having an upper flange and a lower flange and a connecting web therebetween, at least one opening through the upper flange and through the web and having one or more of said capillary tubes passing therethrough;
   cam surfaces connected to said track section in protection of said openings and said capillaries and in guidance of structures moving on said track section in precision relation to said capillary tubes; and
   control means above said upper flange of said track section in selected distribution connection to a source of lubricant and one or more of said capillaries.

2. A central source lubricating system in accord with claim 1 and in which the upper flange of said track sections supports said capillary tubes, control means, lubrication lines, valves, and electrical circuitry, said capillary tubes passing downwardly through said openings in said upper flange and said web and between said cam surfaces and said capillary tubes configured to precision delivery of lubricant to structures moving on said track section.

3. A central lubricating system for conveyors or the like including:
   a plurality of lubricating stations on a common lubrication supply line, each of said stations having one or more valved capillary tubes connected to said supply line and directable to a spot to receive lubrication;
   a limit switch serving one or more capillary tubes and connected to an electrical source and selectively connected to a capacitor discharge structure, said capacitor discharge structure, upon firing, openly connected to a solenoid in at least one valve and said valve opening said supply line to said one or more capillary tubes; and
   means connected to said electrical source and to said capacitor discharge structure to select the interval of capacitor discharge and consequent holding open of solenoid and valves connected to said electrical source.

4. A process for central source lubrication, comprising the steps of:
   guiding and guarding the path of structure in continuous movement;
   directing capillary tubes to precision delivery of lubricant against the path of structure;
   metering the delivery of lubricant through said capillaries by use of an attenuated capacitor discharge to the solenoid of valves connected to said capillaries in accord with precise positioning of said structure in continuous movement.

5. In the process of claim 4 wherein the attenuation of the capacitor discharge is by selected resistance.

6. A lubricating head for selected intermittent discharge of lubricant comprising:
   a normally closed solenoid valve;
   a source of lubricant remote from said valve and connected thereto by a lubrication line;
   one or more capillary tubes operably connected to said valve;
   an electrical control circuit connected to the solenoid of said valve and including a capacitor discharge means and trip therefor;
   resistance means for selectively varying the interval of discharge of said capacitor discharge means and accordingly the quantum of lubricant through said one or more capillary tubes;
   a track section on which said valve and said circuit are mounted and said track section having an upper flange and a lower flange with a connecting web therebetween and including at least one opening through said upper flange and said web with one or more of said capillaries passing therethrough; and
   cam surfaces connected to said track section in protection of said capillaries and in guidance of structures moving on said track section in precision relation to said capillary tubes.

* * * * *